I. B. KETCHUM.
Mill Bolt.
No. 88,792.                              Patented April 13, 1869.
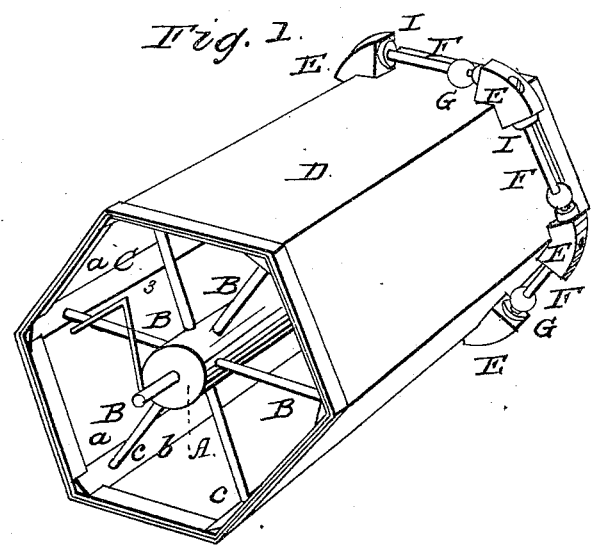
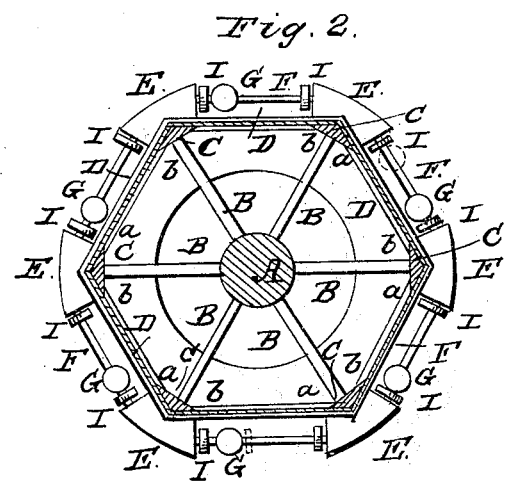
Witnesses
Harry King
Leopold Evert
Inventor
Ira B. Ketchum
Alexander Mason
Attorneys.

IRA B. KETCHUM, OF ROCHESTER, MINNESOTA.

*Letters Patent No. 88,792, dated April 13, 1869.*

IMPROVED FLOUR-BOLT.

The Schedule referred to in these Letters Patent and making part of the same.

*To all whom it may concern:*

Be it known that I, IRA B. KETCHUM, of Rochester, in the county of Olmsted, and in the State of Minnesota, have invented certain new and useful Improvements in Mill-Bolts; and do hereby declare that the following is a full, clear, and exact description thereof, reference being had to the accompanying drawings, and to the letters of reference marked thereon.

The nature of my invention consists in the construction and general arrangement of a "mill-bolt," as will be hereinafter fully set forth.

In order to enable others skilled in the art to which my invention appertains, to make and use the same, I will now proceed to describe its construction and operation, referring to the annexed drawings, which form a part of this specification, and in which—

Figure 1 is a perspective view, and

Figure 2, a vertical section.

A represents the central shaft, from which the rods, or spokes B B radiate.

C C are the ribs, secured to the ends of the spokes B B.

These ribs are flat on their under side, and made in such a manner that the bolting-cloth D will come flush with the inside of the rib at the upper edge, a, and the lower edge, b, of the rib projects in the bolt, more or less, to suit the capacity of the bolt.

At suitable points on the outside of the mill-bolt, on each rib, is secured a block, E.

Between the blocks E E are placed rods F F, with balls G G and rubber rings I I.

By the use of the flat rib C, made as shown and described above, I prevent the flour from being carried to the top of the bolt, and being thrown from the top to the bottom of the bolt, which is the cause of so many specks being in the flour. The flour is kept gently rolling in the bottom of the bolt, and by light raps on the bolt, I can make a better, lighter, livelier, and clearer grade of flour, than by the old style of bolting. I also make more flour, as more bolting-surface is gained.

By the old style of bolting, there is not more than one-half of the flour on the bolting-cloth at any one time. The other half is falling from the top to the bottom, and what is on the cloth does not receive more than two-thirds of the bolting-cloth, owing to the projection of the ribs, while in this bolt I receive all the surface and all the flour on the cloth at the same time.

In warm weather flour will not bolt as free as in cold weather, nor will damp grain bolt as free as dry grain. Dry grain, in cold weather, will not need any rapping, while damp grain, in warm weather, will need heavy rapping.

By the application of the ball-rappers G G to the outside of the bolt, with the rubber rings I I attached, as shown in the drawings, I can make the bolt work as free as the miller may desire, and to suit circumstances, so that, by gently working the flour through the bolt in this way, I prevent the specks from being driven in the flour, and, at the same time, I work the fine qualities of flour through the bolting-cloth, instead of carrying it through the bolt in the shorts and bran, thereby making more flour from the same amount of grain, as well as to make a lighter, livelier, and clearer grade of flour.

I apply the ball-rapper outside of the bolt, and add the rubber rings I I, to stop the noise, and to preserve the blocks E E that hold the rods F F.

The rubber rings may also be moved close to the balls, so as to stop the balls from rapping when rapping is not needed.

Having thus fully described my invention,

What I claim as new, and desire to secure by Letters Patent, is—

The combination of the blocks E E, rods F F, balls G G, and elastic rings I I, when constructed and arranged as described, and placed on the outside of a mill-bolt, substantially as and for the purposes herein set forth.

In testimony that I claim the foregoing, I have hereunto set my hand, this 16th day of January, 1869.

I. B. KETCHUM.

Witnesses:
  J. S. ALLEN, Jr.,
  P. M. TOLBERT.